United States Patent [19]
Watanabe

[11] Patent Number: 5,262,250
[45] Date of Patent: Nov. 16, 1993

[54] STRUCTURE OF ELECTROCHEMICAL CELL FOR WETTING DIAPHRAGM OF SOLID POLYMER ELECTROLYTE

[75] Inventor: Masahoro Watanabe, Kofu, Japan

[73] Assignees: Tanaka Kikinzoku Kogyo K.K.; Masahiro Watanabe, Japan

[21] Appl. No.: 835,222

[22] Filed: Feb. 13, 1992

[30] Foreign Application Priority Data
Feb. 14, 1991 [JP] Japan .................................. 3-042588

[51] Int. Cl.$^5$ .............................................. H01M 8/04
[52] U.S. Cl. ............................................ 429/33; 429/38
[58] Field of Search ........................ 429/33, 72, 30, 38

[56] References Cited
U.S. PATENT DOCUMENTS

| | | | |
|---|---|---|---|
| 4,175,165 | 11/1979 | Adlhart | 429/30 |
| 4,463,066 | 7/1984 | Adlhart et al. | 429/38 X |
| 4,463,068 | 7/1984 | Cohn et al. | 429/38 X |
| 4,467,019 | 8/1984 | Feigenbaum | 429/72 X |
| 4,729,932 | 3/1988 | McElroy | 429/30 X |
| 4,769,297 | 9/1988 | Reiser et al. | 429/30 X |
| 4,973,530 | 11/1990 | Vanderborgh et al. | 429/30 X |

Primary Examiner—Stephen Kalafut
Attorney, Agent, or Firm—Klauber & Jackson

[57] ABSTRACT

Disclosed is an electrochemical cell having a structure of wetting diaphragm made of a solid polymer electrolyte in which at least a narrow path for supplying water to the solid polymer electrolyte is formed. According to the electrochemical cell of this invention, the elevation of performance of the above cell is contemplated by increasing ionic conductivity and excluding burdensome control of water vapor in a reaction gas by means of adding water in the solid polymer electrolyte through the narrow path.

5 Claims, 1 Drawing Sheet

STRUCTURE OF ELECTROCHEMICAL CELL FOR WETTING DIAPHRAGM OF SOLID POLYMER ELECTROLYTE

BACKGROUND OF THE INVENTION

The present invention relates to an electrochemical cell such as a fuel cell and an electrolytic cell employing a solid polymer electrolyte (hereinafter referred to as "PE") and having a structure of wetting the solid polymer electrolyte for attaining high performance.

A fuel cell has been developed as an anti-pollution electric power generator having high energy efficiency in view of problems of exhaustion of energy resources and global environmental pollution.

A fuel cell employing PE is expected to be a lightweight and high power generator which may be useful as a small-size electric source for an electric automobile or the like (disclosed in reference 1; D. Watkins et al., Proceeding of the 33rd International Power Sources Symposium, PP.782 to 791, 13 to 16, June (1988), and in reference 2; E. A. Ticianelli et al., J. Electrochemical Society, 135, 2209, (1988)).

An electrolytic cell using PE is expected to be employed in electro-synthesis starting from such a gaseous hydrocarbon or alcohol as methanol and the like in future.

The performance of these cells is largely influenced by the ionic conductivity of PE employed.

When a sufficient amount of water is not contained in PE, its conductivity considerably decreases with the increase of its resistance to lower the cell performance.

In order to overcome the said drawback, a reaction gas (a hydrogen gas as fuel and oxygen or air as oxidant) containing water vapor may be introduced into a cell.

Since, in this improved cell, a partial pressure of the reaction gas decreases due to dilution with the water vapor by the partial pressure of the water vapor, and further diffusion of the reaction gas in the reaction layer of an electrode is depressed, the characteristics of the cell may be deteriorated.

Since the water pressure which changes with a changing load cannot be sufficiently controlled, PE is dried or the catalyst layer is inversely overwetted resulting in the deterioration of the cell performances.

A larger amount of $H_2O$ is exhausted in an anode side because several molecules of $H_2O$ are accompanied with an $H^+$ ion permeating through PE from the anode to the cathode of which an amount is proportional to a current. However, it is difficult to overcome by the said water vapor mixing process (disclosed in reference 3; T. Springer et al., Extended Abstract No.118, J. Electrochemical Society Meeting, vol.190-2, October (1990)).

Accordingly, these problems should be inevitably overcome for employing the fuel cell as a moving electric source of which a load largely changes, and the same problems exist for an electrolytic cell using PE.

SUMMARY OF THE INVENTION

An object of the present invention is to provide an electrochemical cell for overcoming the problems already mentioned for realizing such an electrochemical cell employing PE as a fuel cell and an electrolytic cell.

Another object is to provide an electrochemical cell having a structure of elevating cell performance by wetting PE with water supplied through a narrow path.

One aspect of the present invention is an electrochemical cell having a structure of wetting diaphragm made of a solid polymer electrolyte in which at least a narrow path for supplying water to the solid polymer electrolyte is formed. Another aspect is the electrochemical cell in which the narrow path formed in the solid polymer electrolyte is formed by anti-corrosive twisted yarns embedded at a uniform interval in the same direction. A further aspect is the electrochemical cell in which the narrow path formed in the diaphragm of the solid polymer electrolyte is not located at the center of the thickness of the diaphragm. A still further aspect is the electrochemical cell in which the narrow path formed in the solid polymer electrolyte is located nearer to the anode than to the cathode, and a still further aspect is the electrochemical cell in which the path is located at the anode side. A still further aspect is the electrochemical cell in which the amount and the supply speed of the water vapor can be changed by compulsorily supplying by means of a pump.

A considerable lowering of the value of the membrane resistance can be realized by employing the membrane wetted in accordance with the present invention so that, consequently, the elevation of the cell voltage is obtained to overcome the conventional drawbacks at one effort that proves the invention to be epoch-making.

BRIEF DESCRIPTION OF THE INVENTION

DETAILED DESCRIPTION OF THE INVENTION

The present invention will be hereinafter described in detail.

The above-mentioned problems can be easily overcome by employing PE as a diaphragm and changing the amount of water according to operation conditions (current density, temperature and the like) to be supplied in one direction through a narrow path formed in the diaphragm.

If the narrow path for supplying the water is formed by anti-corrosive twisted yarns embedded at a uniform interval in the same direction, the water supplied through the anti-corrosive yarns is promptly absorbed into PE by means of a capillary phenomenon.

Moreover, when the narrow path for supplying water is eccentrically disposed nearer to an anode than to a cathode, the drying of the anode can be mainly depressed.

The diaphragm employing the above-mentioned PE may be prepared in laboratories as follows. At first, for example, twisted yarns made of, for instance, Tetron (trademark) are disposed at an interval of 1 mm on a Nafion membrane functioning as PE. A thin film composed of an aluminum foil and a Nafion layer is prepared by applying a Nafion solution on the aluminum foil. Then, the film is disposed on the arranged yarns and is hot-pressed to prepare the above diaphragm. The aluminum foil is dispersed from the diaphragm. The diaphragm may be industrially prepared by incorporating the yarns arranged as mentioned above in an ion exchange membrane to unifying them. However, for the purpose of reinforcing the membrane, yarns rectangularly crossing the above mentioned yarns or a woven cloth or unwoven cloth may be added.

Figure 1:
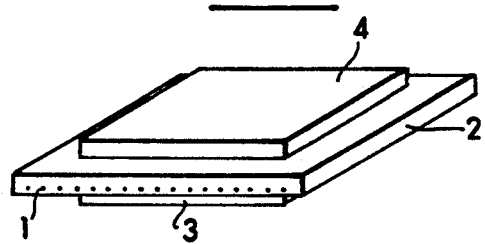
FIG. 1 is a perspective view of a PE membrane embedded with twisted yarns, and joined with and interposed between an anode and a cathode.

FIG. 1 shows one Embodiment of a fuel cell according to the invention which consists of a PE diaphragm 2 and an anode 3 and a cathode 4 functioning as a gas diffusion electrode attached on each side of the diaphragm 2, and a water supply path 1 (path formed by embedding twisted yarns made of Tetron) formed in the diaphragm 2.

Figure 2:
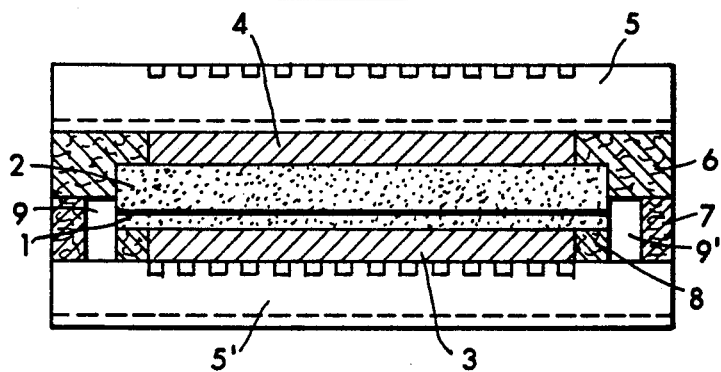
FIG. 2 is a sectional view of a fuel cell employing the PE membrane assembled into a single cell having a sealing structure.

The structure in section of the fuel cell is illustrated in FIG. 2 in which the diaphragm 2 is fixed and sealed by employing packings 6, 7, 8 between a pair of bipolar plates 5, 5' for gas supply which also function as a separator and a current collector.

The water supplied from a lower portion of a stack through an intercellular connection path is supplied from a liquid reservoir (inlet) 9 side through the water supply path 1 to the PE diaphragm 2. The water is then discharged to another liquid reservoir (outlet) 9' side, and then flown out from an upper portion after introduced thereto through an intercellular connection port.

The degree of humidification can be promptly controlled by changing the supply pressure of the water in accordance with operation conditions.

Although the PE membrane embedded with the twisted yarns as the narrow path for supplying water is preferably employed in this invention, the present invention is not restricted thereto, and another PE membrane embedded with twisted yarns made of hollow fibers (for example, polyester hollow fibers having an outer diameter of 20 $\mu$m and an inner diameter of 7 to 8 $\mu$m) preferentially with penetrating fine apertures in the fiber skins may be employed. When such a PE membrane is employed, the water is supplied also through the fine apertures of the hollow fibers because the embedded twisted yarns are composed of the hollow fibers so that the hollow portions of the fibers are impregnated with the water. Since, accordingly, the water supply increases by this amount, the path for supplying water can be narrower depending on the increase of the water supply so that the electroconductivity can be effectively elevated by making the thickness of the PE membrane thinner.

Although Example of the present invention will be hereinafter described, this Example does not restrict the present invention.

EXAMPLE

On commercially available PE (Du Pont; Nafion 117®) having a thickness of about 0.15 mm and a dimension of 50×50 mm, 48 twisted yarns made of Tetron (having a diameter of about 0.1 mm) were disposed at an interval of 1 mm.

Separately, an aluminum foil on the surface of which had been applied liquid PE (Du Pont; Nafion) to form a film having a thickness of 0.05 mm and a dimension of 50×50 mm was disposed on the Tetron yarns, and was hot-pressed at 150° C. and 50 kg/cm² followed by peeling off the aluminum foil to prepare a PE membrane embedded with the Tetron twisted yarns functioning as a narrow path for supplying water.

Gas diffusion electrodes for an anode and a cathode employed in an ordinary phosphoric acid type fuel cell were prepared by loading 30% in weight of a platinum catalyst on carbon black so as to attain a supporting ratio of 0.5 mg-catalyst/cm². On the surface of this catalyst layer, Nafion dissolved in solvent was applied and impregnated at the ratio of 4 mg/cm² according to a method mentioned in the above reference 2.

Thereafter, between the two sheets functioning as an anode and a cathode, the PE membrane prepared as mentioned above was interposed which was then hot-pressed at 25 kg/cm² and 150° C. to prepare a fuel cell employing the PE membrane.

COMPARATIVE EXAMPLE

The fuel cell employing the PE membrane was prepared according to the same procedures of Example except that only the commercially available PE membrane mentioned above was employed in place of the membrane of Example.

The respective fuel cells as prepared in Example and Comparative Example were incorporated in a single cell test apparatus having a cell structure of FIG. 2, and a reference electrode was installed on the membrane of a reservoir (inlet) 9 side. The respective values of the membrane resistance of the anode and the cathode were measured and compared under various conditions employing a current interrupter method. The results are shown in Table 1.

Table 1 shows comparison of the resistance values per unit area of the PE membranes wetted by means of a process of this invention and a conventional vapor wetting method (reaction gases of the anode and cathode were both saturated at 60° C.) when the fuel cells were operated at 60° C.

TABLE 1

| Wetting Process | Wett. Process of Invention | Vapor Wett. Process |
|---|---|---|
| Resistance (A-C) | 0.205 Ω | 0.295 Ω |
| Resistance (A-R) | 0.140 Ω | 0.220 Ω |
| Resistance (C-R) | 0.070 Ω | 0.070 Ω |

A-C; Resistance Between Anode and Cathode
A-R; Resistance Between Anode and Reference Electrode
C-R; Resistance Between Cathode and Reference Electrode As apparent from the A-C values of Table 1, the resistance value of overall membrane according to Example decreased to two-thirds of that of the conventional wetting process. As apparent from comparison of A-R, it has been shown that Example is accompanied with remarkable effects because drying of, especially, the anode side is depressed to bring about a considerable lowering of the value of the membrane resistance. Owing to the lowering of the membrane resistance, the elevation of a cell voltage of about 50 mV in case of the electricity generation at 500 mA/cm², and of 100 mV in case of the electricity generation at 1 A/cm² was obtained.

Figure 3:
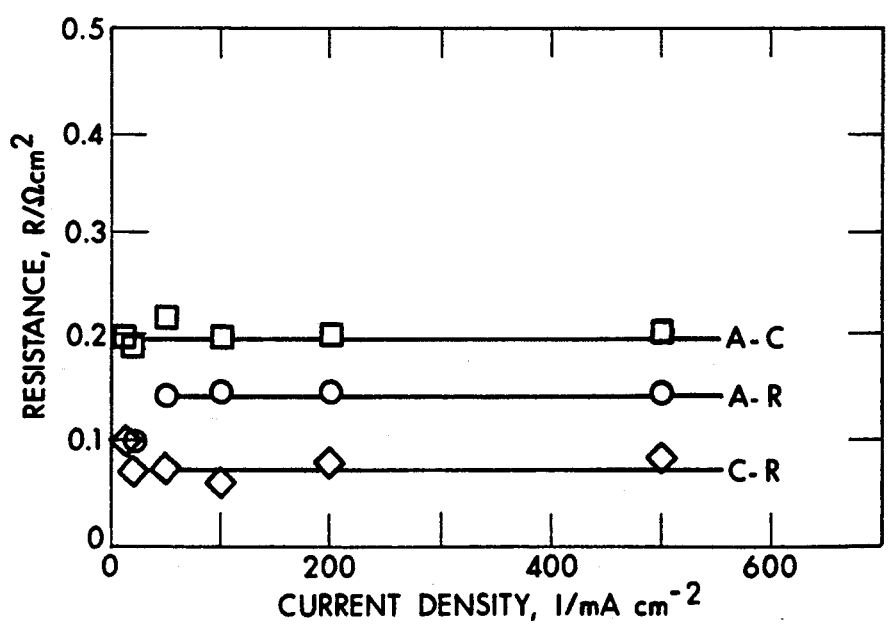
FIG. 3 is a graph showing a current density dependence on a membrane resistance in a structure of wetting PE of the invention.

FIG. 3 shows the dependence of the resistance on the current density. It can be seen that, in high current density electricity generation, at least up to 500 mA/cm², the operation can be carried out without the increase of the resistance value.

What is claimed is:

1. An electrochemical cell comprising a diaphragm comprised of a solid polymer electrolyte, wherein at least one narrow path for supplying water to the solid polymer electrolyte is embedded within the solid polymer electrolyte.

2. The electrochemical cell as claimed in claim 1, wherein the narrow path in the solid polymer electrolyte is formed by anti-corrosive twisted yarns embedded in the solid polymer electrolyte at a uniform interval in the same direction.

3. The electrochemical cell as claimed in claim 1, wherein the diaphragm, comprised of the solid polymer electrolyte, is disposed between anode and a cathode of said electrochemical cell and wherein the narrow path formed in the solid polymer electrolyte is located in a portion of the diaphragm closer to the cathode side.

4. The electrochemical cell as claimed in claim 1, wherein the narrow path formed in the solid polymer electrolyte is located in a portion of the diaphragm closer to the anode side.

5. The electrochemical cell as claimed in claim 1, wherein the water is supplied in the form of water vapor and wherein the amount and the supply speed of the water vapor can be changed by compulsorily supplying by means of a pump.

* * * * *